United States Patent
Dawson et al.

(10) Patent No.: US 9,014,029 B1
(45) Date of Patent: Apr. 21, 2015

(54) MEASURING NETWORK TRANSIT TIME

(75) Inventors: Simon Dawson, Irvine, CA (US);
Gerard J. Heinz, II, Seattle, WA (US);
Brent Ryan Nash, Redondo Beach, CA (US); Bruce McKenzie, Murrieta, CA (US); Heath Hunnicutt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 13/430,048

(22) Filed: Mar. 26, 2012

(51) Int. Cl.
*H04L 12/26* (2006.01)

(52) U.S. Cl.
CPC .......... *H04L 43/0835* (2013.01); *H04L 43/065* (2013.01)

(58) Field of Classification Search
None
See application file for complete search history.

(56) References Cited

U.S. PATENT DOCUMENTS

| | | | |
|---|---|---|---|
| 6,507,837 B1 * | 1/2003 | De La Huerga | 1/1 |
| 6,950,447 B2 * | 9/2005 | Dieterich et al. | 370/516 |
| 6,977,901 B2 * | 12/2005 | Ito et al. | 370/242 |
| 7,120,121 B2 * | 10/2006 | Sikdar | 370/241 |
| 7,545,781 B2 * | 6/2009 | Otsuki et al. | 370/338 |
| 7,970,019 B2 * | 6/2011 | Shay et al. | 370/503 |
| 8,189,487 B1 * | 5/2012 | Mateski et al. | 370/242 |
| 8,301,593 B2 * | 10/2012 | Hoffmann et al. | 707/615 |
| 8,489,720 B1 * | 7/2013 | Morford et al. | 709/223 |
| 8,504,663 B2 * | 8/2013 | Lowery et al. | 709/221 |
| 8,589,537 B2 * | 11/2013 | King et al. | 709/224 |
| 2001/0034799 A1 * | 10/2001 | Ito et al. | 709/250 |
| 2004/0015905 A1 * | 1/2004 | Huima | 717/141 |
| 2005/0094557 A1 * | 5/2005 | Chen et al. | 370/229 |
| 2005/0160312 A1 * | 7/2005 | Seng et al. | 714/13 |
| 2006/0168328 A1 * | 7/2006 | Shimada et al. | 709/238 |
| 2007/0061266 A1 * | 3/2007 | Moore et al. | 705/51 |
| 2008/0117820 A1 * | 5/2008 | Miyazaki et al. | 370/234 |
| 2009/0138784 A1 * | 5/2009 | Tamura et al. | 714/776 |
| 2009/0182874 A1 * | 7/2009 | Morford et al. | 709/224 |
| 2010/0020717 A1 * | 1/2010 | McGregor et al. | 370/252 |
| 2010/0124230 A1 * | 5/2010 | Sakakihara et al. | 370/400 |
| 2010/0211673 A1 * | 8/2010 | Kosbab et al. | 709/224 |
| 2010/0232429 A1 * | 9/2010 | Rao et al. | 370/389 |
| 2011/0238792 A1 * | 9/2011 | Phillips et al. | 709/220 |
| 2012/0030293 A1 * | 2/2012 | Bobotek | 709/206 |
| 2012/0069944 A1 * | 3/2012 | Hadzic et al. | 375/376 |
| 2012/0072575 A1 * | 3/2012 | King et al. | 709/224 |
| 2012/0304023 A1 * | 11/2012 | Wennerberg | 714/49 |
| 2013/0033985 A1 * | 2/2013 | Nakagawa et al. | 370/231 |
| 2013/0177307 A1 * | 7/2013 | Ilie et al. | 398/17 |

\* cited by examiner

*Primary Examiner* — Ian N Moore
*Assistant Examiner* — Phong La
(74) *Attorney, Agent, or Firm* — Thomas Horstemeyer, LLP (57) ABSTRACT

Disclosed are various embodiments to determine network transit time for a packet. A request packet for determining a network transit time is received. A reply packet is transmitted to the requester in response to the request packet. A reply packet is transmitted to the requester. The reply packet includes information about a packet processing time. This packet processing time includes a time between the receiving of the request packet and the transmitting of the reply packet.

17 Claims, 5 Drawing Sheets

MEASURING NETWORK TRANSIT TIME

BACKGROUND

A service provider may offer a number of computing services to a customer and assess the customer various charges for use of these services. The customer is often unaware of what type of computing equipment is used to provide the computing services, as well as the location of the computing equipment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to a computing environment providing one or more computing services to a user, and in particular to measuring network transit time between a user and a computing device providing the computing service. For some types of computing services, the quality of the user experience depends on the time for a packet to travel between the computing service and the client device.

As one example, the service provider may wish to avoid a noticeable delay when a user retrieves a file from a networked storage service. As another example, a user's experience in listening to streaming media is likely degraded when the media packets take a relatively long time to reach the user. As yet another example, a user playing a remotely hosted game will probably experience reduced interactivity and thus reduced enjoyment when the packets involved in providing remote execution take a relatively long time to reach the user. Various embodiments described herein allow a computing environment to determine, in an accurate manner, the network transit time for packets traveling between a client device and a computing device that provides a computing service.

To this end, a client application cooperates with an application hosted in the computing environment to send a request packet to the hosted measurement application and to receive a reply packet from the hosted application. The client application uses a local timer to measure the time from sending the request packet to receiving the reply packet. On receipt of the request packet, the hosted measurement application uses a local timer to determine a packet processing time, i.e., the time for processing the incoming request packet and for processing the outgoing reply packet. This packet processing time is included in the reply packet. The client application then subtracts the packet processing time from the locally measured packet transit time to produce an accurate measure of network transit time. If the computing environment utilizes virtual machines or other virtualization techniques, this measure of network transit time, which takes into account processing time at the computing environment endpoint, may be more accurate than other measures because packet processing time may be quite variable in a virtualized environment.

Various embodiments described herein also allow the computing environment to monitor the reliability of the times reported by the hosted measurement application. When it is determined that the network transit times reported by the hosted application are unreliable, the unreliable hosted application may be taken offline or out-of-service. The unreliable hosted application may then be reinitialized and/or restarted, or another hosted application may be brought online to replace the unreliable hosted application.

Various embodiments described herein also allow the computing environment to provide the client application with a list of hosted measurement applications in different divisions of the computing environment. For example, the client application may obtain packet processing times from hosted applications in different data centers or different availability zones within the same data center. A comparison of network transit times for different availability zones may be used to select a particular availability zone for providing a computing service. Similarly, a comparison of network transit times for different data centers may be used to select a particular data center for providing a computing service. In the following discussion, a general description of the system and its components is provided, followed by a discussion of the operation of the same.

Figure 1:
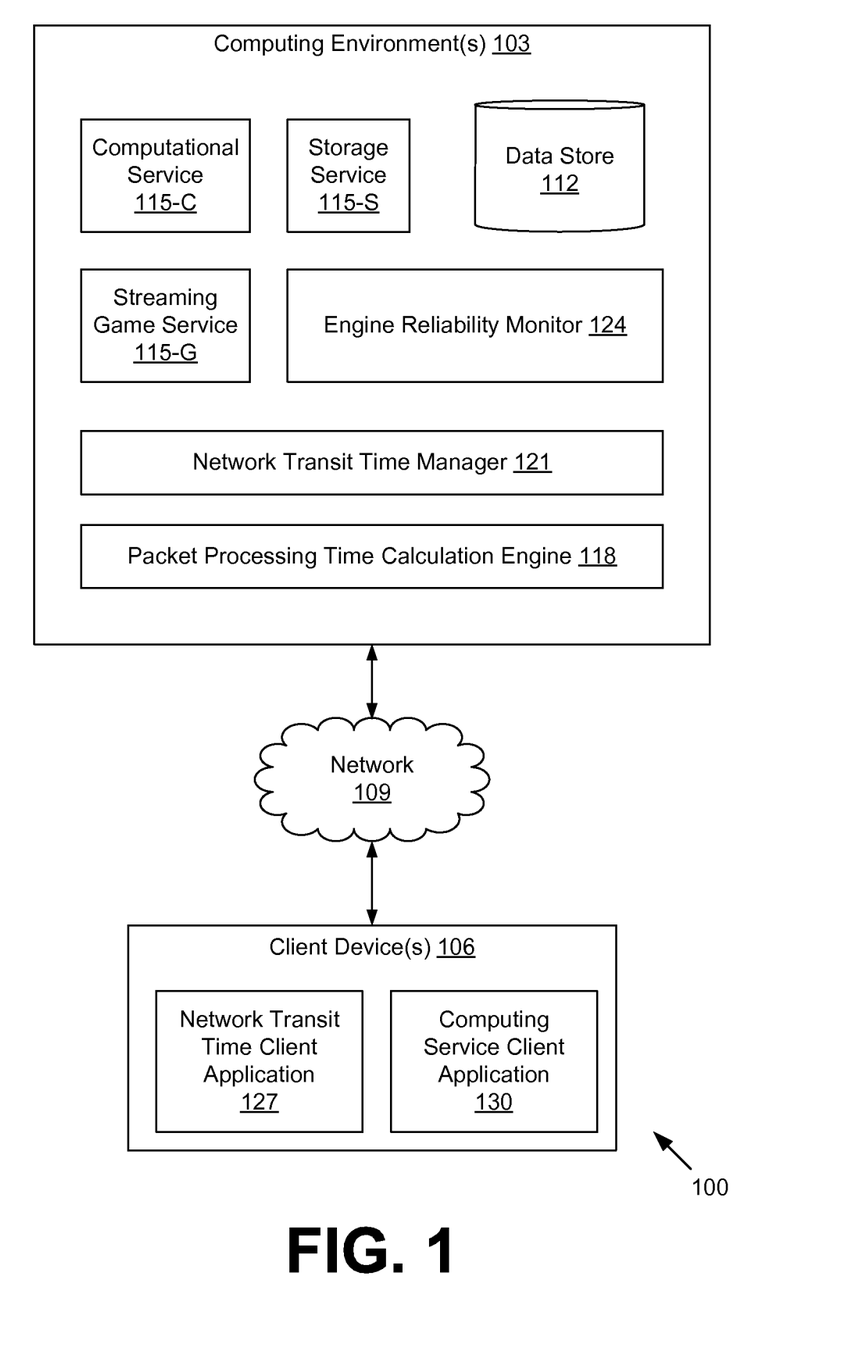
FIG. 1 is a drawing of a networked environment according to one embodiment of the present disclosure.

With reference to FIG. 1, shown is a networked environment 100 according to various embodiments. The networked environment 100 includes a computing environment 103 in data communication with one or more client devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing environment 103 may comprise, for example, a server computer or any other system providing computing capacity. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

The computing environment 103 may be operated by a hosting provider to host network sites for various entities, or may be controlled and managed by a provider entity that provides access to resources of the computing environment 103 to entities for a fee under a utility computing model. For example, entities may arrange for access to applications executing in the computing environment 103, for storage in the computing environment 103, or for messaging between components in the computing environment 103. Such a system is sometimes referred to as "cloud computing system," but the term "cloud computing" is not intended to be limiting.

The computing environment 103 may utilize differing hardware platforms and may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. The computing environment 103 may be executing instances of virtual machines used to provide general computing capability to entities. Such entities may be capable of terminating machine instances or launching machine instances whenever they desire, thereby providing an elastic computing resource.

Various applications and/or other functionality may be executed in the computing environment 103 according to various embodiments. Also, various data may be stored in a data store 112 that is accessible to the computing environment 103. The components executed in the computing environment 103 may include, for example, one or more computing services 115, and a packet processing time calculation engine 118, a network transit time manager 121, and an engine reliability monitor 124. The computing environment 103 may also execute other applications, services, processes, systems, engines, or functionality not discussed in detail herein. These components may utilize web services to interact with each other and/or with client applications. These web services may be implemented via a variety of middleware frameworks, such as remote procedure calls, service-oriented architecture (SOA), representational state transfer (REST), and other frameworks.

The example list of services 115 shown in the computing environment 103 includes a network storage service 115-S, a network computational service 115-C, and a streaming game service 115-G. The computing environment 103 may make one or more of these services 115 available to users for a fee. The computing environment 103 may authenticate a user before making a particular service 115 available to that user, or before making a particular resource in the computing environment 103 provided by the service 115 available to that user. Some or all of the functionality of a computing service 115 may be exported through a programmatic interface, for example, a web service.

The packet processing time (PPT) calculation engine 118 is executed to service requests from a client application in order to aid the client application in determining the time taken by packets to traverse the network 109 from a client device 106 to a particular computing device within the computing environment 103. The client application measures the total packet transit time, which includes both the actual network transit time and the time taken by the endpoints to process the packet. The client application therefore sends a request packet to a particular PPT calculation engine 118, and the PPT calculation engine 118 sends back a reply packet. The reply packet includes a packet processing time representing the time taken by the PPT calculation engine 118 to process the request packet. The client application then subtracts the packet processing time from the total transit time to produce a more accurate measure of network transit time. In order to minimize processing time, some embodiments of the packet processing time calculation engine 118 may be implemented in a compiled language such as C, C++, and/or C# rather than an interpreted language such as Java.

The network transit time manager 121 is executed to provide a client application with a list of packet processing time calculation engines 118 upon request. In some embodiments, the list provided by the network transit time manager 121 is a list of Internet Protocol (IP) addresses rather than Uniform Resource Locators (URLs).

Having discussed the computing environment 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability.

The client device 106 may be configured to execute various applications such as a network transit time client application 127 and a computing service client application 130. The client device 106 may be configured to execute applications beyond the network transit time client application 127 and the computing service client application 130, such as browser applications, email applications, messaging applications, and/or other applications.

The computing service client application 130 may be executed in the client device 106, for example, to request a particular computing service provided by the computing environment 103 or access to a particular resource hosted by the computing environment 103. The computing service client application 130 may utilize web services to interact with the one or more computing services 115. These web services may be implemented via a variety of middleware frameworks, such as remote procedure calls, service-oriented architecture (SOA), representational state transfer (REST), and other frameworks. The network transit time client application 127 may be executed in the client device 106, for example, to determine a network transit time for packets traveling between the client device 106 and a particular host device in the computing environment 103. To this end, the network transit time client application 127 may send network transit time request packets to a packet processing time calculation engine 118, and to receive corresponding reply packets in response to these requests. In some embodiments, the network transit time request packets may take the form of Hypertext Transfer Protocol (HTTP) requests. By using HTTP rather than a lower-level protocol such as Transmission Control Protocol (TCP), User Datagram Protocol (UDP), or ICMP (Internet Control Message Protocol), the network transit time request and reply packets may be more likely to successfully transit firewalls and gateways.

Figure 2:
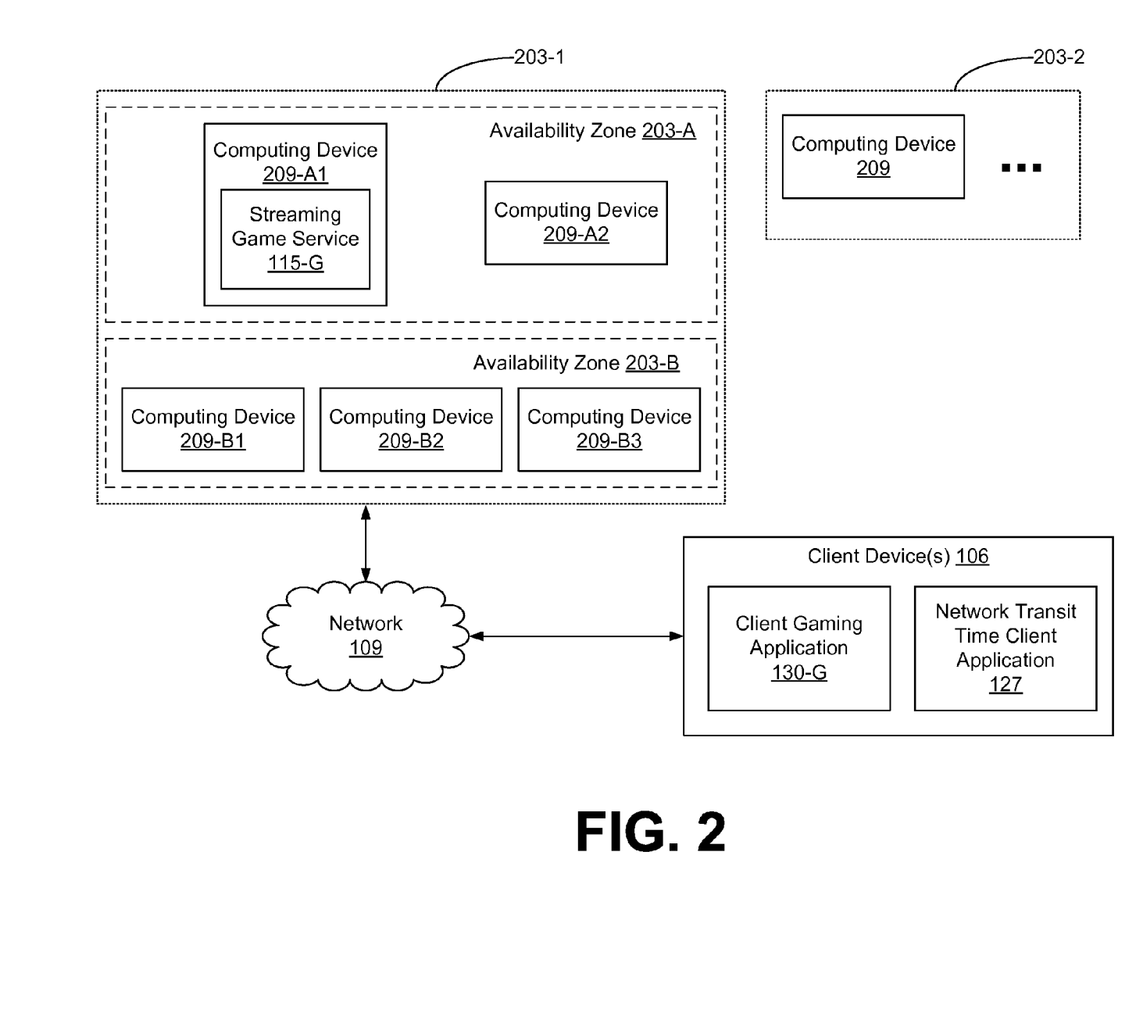
FIG. 2 is a drawing showing another view of the networked environment of FIG. 1 according to an example embodiment of the present disclosure.

Turning now to FIG. 2, shown is another view of an example embodiment of the networked environment 100. In FIG. 1, the computing environment 103 is illustrated as simply a collection of computing devices executing various applications, engines, components, etc., with no regard to how the computing devices are physically or geographically arranged. FIG. 2 illustrates that resources in the computing environment 103 are physically distributed. The computing environment 103 is distributed among one or more data centers 203-1 ... N. Each data center 203 may further be divided into one or more availability zones 206-A ... N. Thus, a particular computing environment 103 is located in a particular availability zone 206 of a particular data center 203.

In the example configuration shown in FIG. 2, the computing environment 103 includes two data centers, 203-1 and 203-2. The data center 203-1 includes two availability zones, 206-A and 206-B. The availability zone 206-A includes two computing devices, 209-A1 and 209-A2, while the availability zone 206-B includes three computing devices, 209-B1 . . . B3. Data center 203-2 is not shown in further detail.

As used herein, "data center" refers to a set of computing devices 209 residing in a small geographic area such as a floor of a single building, a single building, a set of buildings on a campus, etc. The different availability zones 206 of a data center 203 are dispersed and isolated in some way from one another. As one example, the computing devices 209 in one availability zone 206 may utilize a different power main from the utility company than the computing devices 209 in another availability zone 206. As another example, the computing devices 209 in one availability zone 206 may utilize a different network backbone connection from the Internet service provider than the computing devices 209 in another availability zone 206. Because of this purposeful distribution, a catastrophic event that occurs in one availability zone 206 is unlikely to affect another availability zone 206.

A general description of the operation of the various components of the networked environment 100 is now provided. As described earlier, the computing environment 103 includes various computing services 115 which users may utilize for various purposes, such as storage and execution of applications. Utilization of these computing services 115 involves transporting packets between a computing service 115 and an application executing on the client device 106, and for some of these computing services 115, the quality of the user experience depends on the time for a packet to travel between the computing service 115 and the client device 106.

For example, a streaming game service 115-G interacts with a client gaming application 130-G executing on a client device 106 to allow a user to play a game remotely, that is, to play a game that is executing on a resource in the computing environment 103 rather than executing locally on the client device 106. Quality of the user experience is enhanced when the time for a packet to travel between the streaming game service 115-G and the client gaming application 130-G is relatively small.

To this end, the network transit time client application 127 executes on a client device 106 to determine the network transit time between the current location of the client device 106 and a particular computing device 209. One component of the network transit time is the total time for a request packet to travel, over the network 109, from a client device 106 to the computing device 209 and for a corresponding reply to be received by the client device 106. Another component of the network transit time is the time spent by each endpoint (i.e., the client device 106 and the computing device 209) to process the request and reply packets. To increase the accuracy of the network transit time, the network transit time client application 127 subtracts the processing time from the total time, so that what remains can be attributed in large part to the actual network transit time. Since other components in the network 109 also perform some amount of processing on packets as they transit through those components, the network transit time determined by the network transit time client application 127 may not be as accurate as possible. However, it is expected that the processing time by the endpoints dominates the processing time by the intermediate components, so that accounting for the processing time of one or both endpoints produces a suitable measure of network transit time.

The network transit time client application 127 determines the first component, i.e., the total time, by sending a request packet to the computing device 209 and waiting for a corresponding reply, and by noting the time at which the request is transmitted and the time at which the reply is received. The current time as maintained on a clock in the client device 106 may be used in obtain these times. Alternatively, a timer may be started when the request is transmitted and stopped when the reply is received.

The network transit time client application 127 determines the second component, i.e., in cooperation with the packet processing time calculation engine 118 executing on the target computing device 209. To this end, the network transit time client application 127 sends a request packet to the packet processing time calculation engine 118 executing on the target computing device 209, requesting aid in calculating the network transit time. The network transit time client application 127 responds by sending a reply packet which includes the packet processing time on the target computing device 209. The network transit time client application 127 then subtracts the packet processing time from the locally tracked packet transit time in order to obtain the network transit time. Some embodiments of the network transit time client application 127 obtain multiple packet processing times from a particular packet processing time calculation engine 118 and then derive a statistical measure from the multiple packet processing times in order to determine a final network transit time. The statistical measure may be an average, a median, or any other suitable statistic. Using a statistical measure of multiple processing times rather than a single processing time can be advantageous in accounting for outlier values or in smoothing variation between reported times.

In some embodiments, the network transit time manager 121 contacts a particular, predefined packet processing time calculation engine 118 or predefined list of time calculation engines 118. In other embodiments, the network transit time manager 121 provides the network transit time client application 127 with a list of one or more time calculation engines 118, and the client application 127 obtains network transit times from the time calculation engines 118 on the list. In one use case scenario, the network transit time manager 121 may provide the client application 127 with a list of several time calculation engines 118 in a particular data center 203. The client application 127 may then choose to obtain computing services from computing devices 209 in the data center 203 having a relatively low, or the lowest, network transit time, rather than from computing devices 209 in another data center 203 having a higher network transit time. For example, a client gaming application 130-G may select a streaming game service 115-G based on network transit times to enhance the quality of game play.

In another use case scenario, the network transit time manager 121 may provide the client application 127 with a list of packet processing time calculation engines 118 corresponding to different availability zones 206 in the same data center 203. The client application 127 may then choose to obtain computing services 115 from computing devices 209 in the availability zone 206 having a relatively low, or the lowest, network transit time, rather than from computing devices 209 in another availability zone 206 having a higher network transit time. For example, a network storage access application may select a network-based storage service 115-S based on network transit times to reduce access time when storing or retrieving files. In some embodiments, the client application 127 may enforce a maximum network transit time before choosing to utilize a computing service 115. For example, the client application 127 may choose to use a computing service 115 only if at least one of the computing devices 209 has a network transit time that is less than a predefined maximum. The maximum for the network transit time may be specific to the type of computing service 115. For example, a network storage access application may tolerate a higher maximum transit time than a client gaming application 130-G.

In yet another use case scenario, the choice of data center 203 and/or availability zone 206 is driven by the network transit time manager 121 rather than by the network transit time client application 127. In this scenario, a computing service client application 130 makes a request to the computing environment 103 for a particular computing service 115, but does not specify which particular computing device 209 will provide the requested computing service 115. In handling this computing service request, the network transit time manager 121 provides the network transit time client application 127 executing on the same client device 106 with a list of packet processing time calculation engines 118 in various data centers 203 and availability zones 206. The list may include an identifier or address for each of the packet processing time calculation engines 118.

The network transit time client application 127 operates as described herein to determine a network transit time corresponding to the transit time to/from each of the packet processing time calculation engines 118, and provides these times back to the manager application 121. The manager application 121 then selects a particular data center 203 and/or availability zone 206 based on the network transit time, and the computing environment 103 selects computing device 209 in this data center 203 and/or availability zone 206 to be the provider of the computing service requested by the computing service client application 130. In this manner the computing service client application 130 could, for example, select an appropriate streaming game service 115-G based on network transit times to enhance the quality of game play.

Also executing in the computing environment 103 are one or more engine reliability monitors 124, each of which is responsible for monitoring the reliability of the network transit times reported by a packet processing time calculation engine 118 or group of time calculation engines 118. The engine reliability monitor 124 may determine reliability by receiving network transit times from a PPT calculation engine 118, or by receiving some other information representative of the reliability of the network transit times, for example, error metrics, or performance measurements for the PPT calculation engine 118 or for the computing device 209 on which it executes. In some embodiments, an engine reliability monitor 124 is located in the same data center 203 and/or same availability zone 206 as the monitored PPT calculation engine 118.

Figure 3:
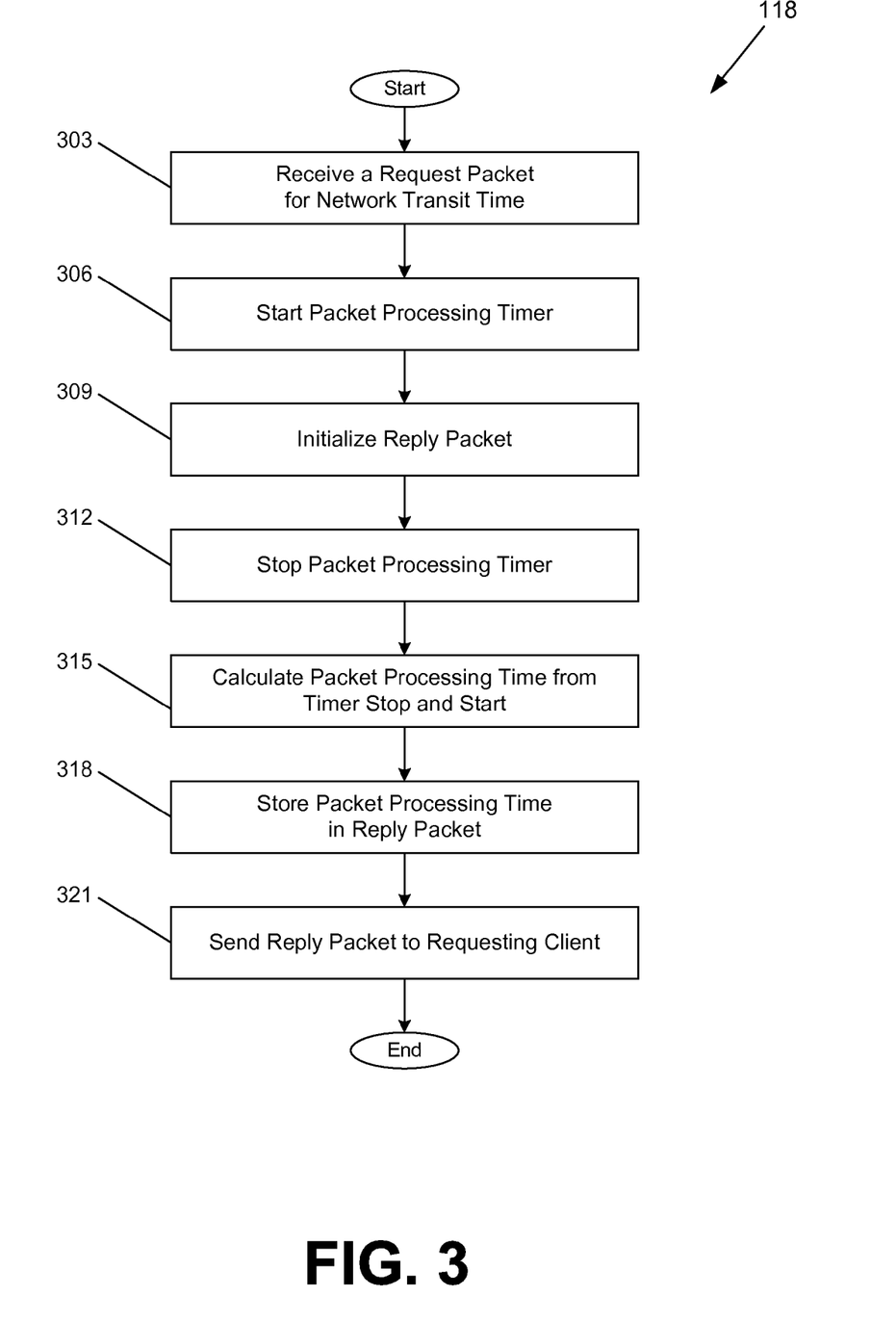
FIG. 3 is a flowchart illustrating an example of functionality implemented as portions of an application executed in the computing environment of FIG. 1 according to various embodiments of the present disclosure.

With reference now to FIG. 3, shown is a flowchart that provides one example of the operation of portion(s) of the packet processing time calculation engine 118 (FIG. 1) according to various embodiments. It is understood that the flowchart of FIG. 3 provides merely an example of the many different types of functional arrangements that may be employed to implement the operation of portion(s) of the packet processing time calculation engine 118 as described herein. As an alternative, the flowchart of FIG. 3 may be viewed as depicting an example of steps of a method implemented in the packet processing time calculation engine 118 according to one or more embodiments.

Beginning at box 303, the packet processing time calculation engine 118 receives, from a network transit time client application 127 (FIG. 1), a packet indicating a request for determining a network transit time. In some embodiments, the PPT calculation engine 118 (FIG. 1) and the client application 127 communicate using Hypertext Transfer Protocol (HTTP), such that the received packet is an HTTP packet. In some embodiments, the HTTP packet is an HTTP Head request packet. The HTTP Head request packet is smaller than other types of HTTP requests and may therefore be advantageous in minimizing the packet processing time and/or network transit time. The headers of the HTTP request packet and/or the HTTP response packet may be set to avoid caching of these packets, which is also advantageous in minimizing the packet processing time and/or network transit time.

Upon receiving the request, the packet processing time calculation engine 118 at box 306 starts a packet processing timer. In order to provide an accurate timer, the packet processing timer is started soon after receipt of the request packet, without intervening actions unrelated to calculating a packet processing time, though housekeeping actions such as saving state and initializing data structures may be taken by the packet processing time calculation engine 118.

In some embodiments, the request packet is received by a kernel mode handler and is passed up to the packet processing time calculation engine 118, which executes in user mode. The kernel mode receive handler may take the form of a device driver or a layer of a protocol stack, and may communicate with the packet processing time calculation engine 118 through an inter-mode communication mechanism, as may be appreciated. Such a mechanism may involve the time calculation engine 118 registering a notification function with the kernel, the protocol stack, and/or the device driver, as may be appreciated. In some embodiments, the PPT calculation engine 118 registers to receive HTTP packets on port 80.

Next, at box 309, the packet processing time calculation engine 118 creates and initializes a reply packet to respond to the received request. The reply packet is initialized so that that the destination of the packet is the source of the request, that is, the network transit time client application 127. The reply packet may include a source identifier and/or sequence number that is initialized by copying the contents of a corresponding source identifier and/or sequence number in the request received at box 303. The reply packet includes a packet processing time field that is filled in by the packet processing time calculation engine 118 at box 312. In some embodiments, the reply packet includes additional field(s) that are initialized from corresponding data field(s) in the received request packet. As noted above, in some embodiments, the request packet received by the PPT calculation engine 118 takes the form of an HTTP Head Request. In some of these HTTP embodiments, the reply packet initialized at box 309 is an HTTP Response to the Head Request.

At box 312, having created the reply packet, the packet processing time calculation engine 118 stops the packet processing timer started at box 306. Next, at box 315, the PPT calculation engine 118 calculates the packet processing time as the difference between the start time and the stop time.

At box 318, the packet processing time calculation engine 118 stores the packet processing time calculated at box 315 in the reply packet that was initialized at box 309. As noted above, in some embodiments the reply packet takes the form of an HTTP Response to an HTTP Head Request. In some of these HTTP embodiments, the packet processing time is stored in the message body of the HTTP Response. In others of these HTTP embodiments, the packet processing time is stored in the HTTP Response header or in the entity header of the HTTP Response.

Having calculated and stored the packet processing time in the reply packet, the packet processing time calculation engine 118 at box 321 transmits the reply packet to the network transit time client application 127 that is executing on the client device 106. The process of FIG. 3 is then complete. In some embodiments, the PPT calculation engine 118 executes in user mode and passes the reply packet to a kernel mode handler for transmission. The kernel mode transmit handler may take the form of a device driver or a layer of a protocol stack, and the engine 118 may obtain an entry point to the kernel mode transmit handler by registering with the kernel, the protocol stack, and/or the device driver.

In order to provide an accurate timer, the reply packet is transmitted immediately upon stopping the packet processing timer, without intervening actions unrelated to transmission, though housekeeping actions such as saving state and initializing data structures may be taken by the packet processing time calculation engine 118. Some embodiments stop the packet processing timer before passing the reply packet down to kernel mode transmission.

In the embodiment described in connection with FIG. 3, the engine 118 determines packet processing time by starting and stopping a timer. In other embodiments, the current time as maintained by a clock in the computing device 209 may be used instead to obtain these times.

Figure 4:
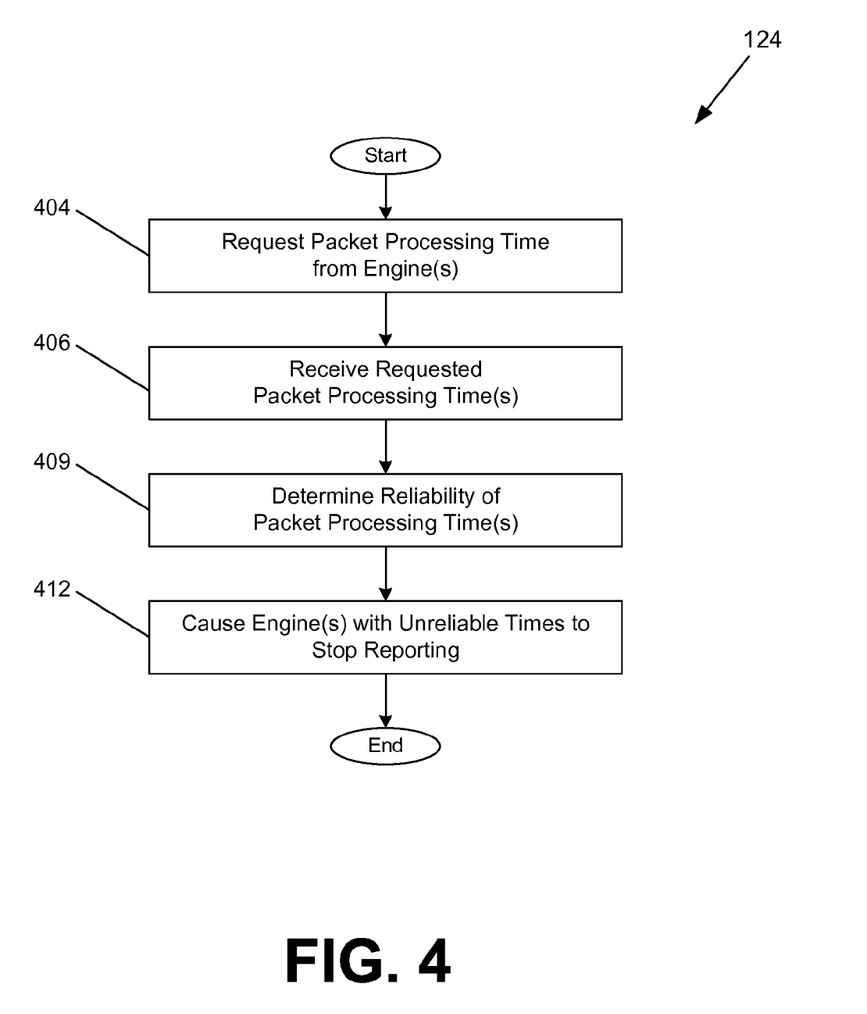
FIG. 4 is a flowchart illustrating another example of functionality implemented as portions of an application executed in the computing environment of FIG. 1 according to various embodiments of the present disclosure.

Moving on to FIG. 4, shown is a flowchart that provides one example of the operation of portion(s) of the engine reliability monitor 124 (FIG. 1) according to various embodiments. It is understood that the flowchart of FIG. 4 provides merely an example of the many different types of functional arrangements that may be employed to implement the operation of portion(s) of the engine reliability monitor 124 as described herein. As an alternative, the flowchart of FIG. 4 may be viewed as depicting an example of steps of a method implemented in the engine reliability monitor 124 according to one or more embodiments.

Beginning at box 403, the engine reliability monitor 124 requests a packet processing time from each of a group of packet processing time calculation engines 118 (FIG. 1). In some embodiments, the group includes a predefined number of time calculation engines 118 in each availability zone 206 (FIG. 2) of a particular data center 203 (FIG. 2). Next, at box 406, the monitor 124 receives packet processing times in response to the requests.

At box 409, the engine reliability monitor 124 evaluates the received packet processing times and determines whether any of the time calculation engines 118 are reporting unreliable times, as compared to the other time calculation engines 118 in the group. In some embodiments, the monitor 124 compares the last reported time for each PPT calculation engine 118 to a running average for the group, and determines that a particular PPT calculation engine 118 is unreliable if the last reported time exceeds the running average, or exceeds the running average by a predefined threshold. In other embodiments, the engine reliability monitor 124 maintains a history of previously reported times from each calculation, and determines that a particular PPT calculation engine 118 is unreliable if the last reported time exceeds a particular number of standard deviations. Other statistical comparisons can be utilized to determine unreliability, as should be appreciated.

In the embodiment described in connection with FIG. 4, the engine reliability monitor 124 obtains reliability information for the packet processing time calculation engines 118 by acting as a client and specifically requesting packet processing times from the packet processing time calculation engines 118. In another embodiment, the monitor 124 obtains reliability information indirectly, by obtaining health, diagnostic, performance, status, and/or error information respective packet processing time calculation engines 118, and/or about computing devices 209 on which respective time calculation engines 118 execute. The engine reliability monitor 124 can use such information as a proxy for reliability of the packet processing time calculation engines 118. That is, the monitor 124 can determine whether the reported information is a likely indication that the packet processing time reported by a given packet processing time calculation engine 118 is unreliable.

As one example, one or more error metric(s) such as a number of packet errors may be compared to predefined threshold(s), and the engine reliability monitor 124 may designate a particular packet processing time calculation engine 118 to be unreliable when an error metric, or combination or error metrics, exceeds the threshold. As another example, a performance measure such as processor utilization by the calculation engine process may be compared to predefined thresholds, and the engine reliability monitor 124 may designate a particular packet processing time calculation engine 118 to be unreliable when the performance measure, or combination of measures, either exceeds or falls under the threshold, as appropriate.

Next, at box 412, the engine reliability monitor 124 takes action to cause any of the unreliable packet processing time calculation engines 118 to cease reporting packet processing times. The process of FIG. 4 is then complete. In some embodiments, the action at box 412 may take the form of stopping the unreliable engine 118, taking the unreliable engine 118 out of service, restarting the engine 118, or shutting down and/or restarting the computing device 209 on which the engine 118 executes. In some embodiments, another packet processing time calculation engine 118 replaces the unreliable engine 118.

In other embodiments, the action at box 412 takes the form of notifying the network transit time manager 121, and the network transit time manager 121 handles the unreliable packet processing time calculation engine 118 by stopping the engine 118, taking the engine 118 out of service, restarting the engine 118, or shutting down and/or restarting the computing device 209 on which the engine 118 executes. In some embodiments, the network transit time manager 121 brings another engine 118 in service to replace the unreliable engine 118. In such embodiments, the network transit time takes into account the in-service and out-of-service engines 118 when providing a network transit time client application 127 with a list of engines 118 from which to obtain transit times.

Figure 5:
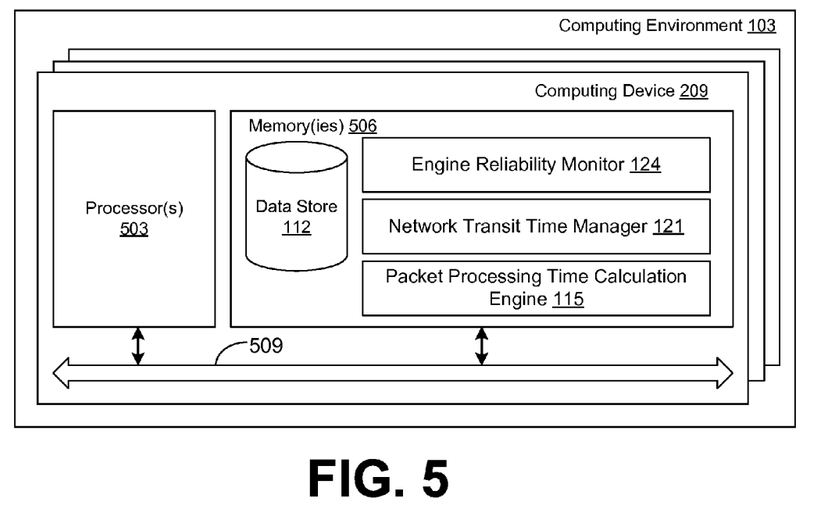
FIG. 5 is a schematic block diagram that provides one example illustration of a computing device employed in the computing environment of FIG. 1 according to various embodiments of the present disclosure.

Turning now to FIG. 5, shown is a schematic block diagram of a computing device 209 according to an embodiment of the present disclosure. The computing device 209 corresponds to a representative computing device which may be employed in the computing environment 103 (FIG. 1). The computing device 209 includes at least one processor circuit, for example, having a processor 503 and a memory 506, both of which are coupled to a local interface 509. To this end, the computing device 209 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network transit time manager 121, the engine reliability monitor 124, the packet processing time calculation engine 118 and potentially other applications. In addition, an operating system may be stored in the processor 503 and executable by the processor 503. Although not illustrated, the client device 106 also includes a processor and memory coupled by a local interface, wherein software components such as the network transit time client application 127 and the computing service client application 130 are stored in the memory and executed by the processor.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the network transit time manager 121, the engine reliability monitor 124, the packet processing time calculation engine 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the packet processing time calculation engine 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in the flowcharts of FIGS. 3 and 4 may be executed concurrently or with partial concurrence. Further, in some embodiments, one or more of the blocks shown in the flowcharts of FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the packet processing time calculation engine 118, the network transit time manager 121, and the engine reliability monitor 124) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer readable medium embodying a program executable in a computing device, comprising:
    code that obtains reliability information corresponding to a reliability of a packet processing time as reported by at least a portion of a plurality of packet processing time calculation engines;
    code that determines, based at least in part on the reliability information, whether any of the portion of the plurality of packet processing time calculation engines are unreliable as compared to other ones of the plurality of packet processing time calculation engines in the portion of the plurality of packet processing time calculation engines;
    code that causes an unreliable packet processing time calculation engine to cease reporting packet processing times;
    code that notifies another computing device about the unreliable packet processing time calculation engine, wherein the another computing device replaces the unreliable packet processing time calculation engine with another packet processing time calculation engine;
    code that causes the unreliable packet processing time calculation engine to stop executing;
    code that sends, to the portion of the plurality of packet processing time calculation engines, a corresponding plurality of requests for measurement of a packet processing time; and
    code that receives, from individual ones of the portion of the plurality of packet processing time calculation engines, a reply that includes the packet processing time generated by a respective packet processing time calculation engine.

2. The non-transitory computer readable medium of claim 1, further comprising code that causes the unreliable packet processing time calculation engine to restart.

3. The non-transitory computer readable medium of claim 1, further comprising code that causes the another packet processing time calculation engine to replace the unreliable packet processing time calculation engine.

4. The non-transitory computer readable medium of claim 1, further comprising code that obtains performance information for a hardware resource of the plurality of packet processing time calculation engines.

5. The non-transitory computer readable medium of claim 1, further comprising:
    code that obtains error information corresponding to errors experienced by a hardware resource of the plurality of packet processing time calculation engines; and
    code that obtains the packet processing times reported by the portion of the plurality of packet processing time calculation engines.

6. A system, comprising:
    at least one computing device comprising at least a processor and a memory; and
    an application stored in the memory and executable by the processor, wherein the application comprises:
        logic that obtains reliability information corresponding to a reliability of a packet processing time as reported by at least a portion of a plurality of packet processing time calculation engines;
        logic that determines, based at least in part on the reliability information, whether any of the portion of the plurality of packet processing time calculation engines are unreliable as compared to other ones of the plurality of packet processing time calculation engines in the portion of the plurality of packet processing time calculation engines;
        logic that causes an unreliable packet processing time calculation engine to cease reporting packet processing times;
        logic that notifies another computing device about the unreliable packet processing time calculation engine, wherein the another computing device replaces the unreliable packet processing time calculation engine with another packet processing time calculation engine;
        logic that causes the unreliable packet processing time calculation engine to stop executing;
        logic that sends, to the portion of the plurality of packet processing time calculation engines, a corresponding plurality of requests for measurement of a packet processing time; and
        logic that receives, from individual ones of the portion of the plurality of packet processing time calculation engines, a reply that includes the packet processing time generated by a respective packet processing time calculation engine.

7. The system of claim 6, wherein the application further comprises logic that causes the unreliable packet processing time calculation engine to restart.

8. The system of claim 6, wherein the application further comprises logic that causes the another packet processing time calculation engine to replace the unreliable packet processing time calculation engine.

9. The system of claim 6, wherein the application further comprises logic that obtains performance information for a hardware resource of the plurality of packet processing time calculation engines.

10. The system of claim 6, wherein the application further comprises logic that obtains error information corresponding to an error experienced by a hardware resource of the plurality of packet processing time calculation engines.

11. The system of claim 10, wherein the application further comprises logic that obtains the packet processing times reported by the portion of the plurality of packet processing time calculation engines.

12. A computer-implemented method, comprising:
    receiving, via at least one of one or more computing devices, reliability information corresponding to a reliability of a packet processing time as reported by at least a portion of a plurality of packet processing time calculation engines;
    determining, via at least one of the one or more computing devices, whether any of the portion of the plurality of packet processing time calculation engines are unreliable as compared to other ones of the plurality of packet processing time calculation engines in the portion of the plurality of packet processing time calculation engines based at least in part on the reliability information;

causing, via at least one of the one or more computing devices, an unreliable packet processing time calculation engine to cease reporting packet processing times;

notifying, via at least one of the one or more computing devices, another computing device about the unreliable packet processing time calculation engine, wherein the another computing device replaces the unreliable packet processing time calculation engine with another packet processing time calculation engine;

causing, via at least one of the one or more computing devices, the unreliable packet processing time calculation engine to stop executing;

sending, via at least one of the one or more computing devices, to the portion of the plurality of packet processing time calculation engines, a corresponding plurality of requests for measurement of a packet processing time; and receiving, via at least one of the one or more computing devices, from individual ones of the portion of the plurality of packet processing time calculation engines, a reply that includes the packet processing time generated by a respective packet processing time calculation engine.

13. The computer-implemented method of claim 12, further comprising causing, via at least one of the one or more computing devices, the unreliable packet processing time calculation engine to restart.

14. The computer-implemented method of claim 12, further comprising causing, via at least one of the one or more computing devices, the another packet processing time calculation engine to replace the unreliable packet processing time calculation engine.

15. The computer-implemented method of claim 12, further comprising receiving, via at least one of the one or more computing devices, performance information for a hardware resource of the plurality of packet processing time calculation engines.

16. The computer-implemented method of claim 12, further comprising receiving, via at least one of the one or more computing devices, error information corresponding to at least one error experienced by a hardware resource of the plurality of packet processing time calculation engines.

17. The computer-implemented method of claim 16, further comprising receiving, via at least one of the one or more computing devices, the packet processing times reported by the portion of the plurality of packet processing time calculation engines.

* * * * *